US011303956B2

(12) United States Patent
Rengaraju et al.

(10) Patent No.: US 11,303,956 B2
(45) Date of Patent: Apr. 12, 2022

(54) SYSTEMS AND METHODS FOR INTERNET PROTOCOL TUNING

(71) Applicant: Verizon Patent and Licensing Inc., Arlington, VA (US)

(72) Inventors: Ganesan Rengaraju, Irving, TX (US); Jaykishan Tiwari, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 141 days.

(21) Appl. No.: 16/567,909

(22) Filed: Sep. 11, 2019

(65) Prior Publication Data
US 2021/0076093 A1 Mar. 11, 2021

(51) Int. Cl.
| | |
|---|---|
| *H04N 5/445* | (2011.01) |
| *G06F 3/00* | (2006.01) |
| *G06F 13/00* | (2006.01) |
| *H04N 21/438* | (2011.01) |
| *H04N 21/858* | (2011.01) |
| *H04N 21/4627* | (2011.01) |
| *H04N 21/435* | (2011.01) |
| *H04N 21/4408* | (2011.01) |
| *H04N 21/643* | (2011.01) |

(52) U.S. Cl.
CPC ....... *H04N 21/4383* (2013.01); *H04N 21/435* (2013.01); *H04N 21/4408* (2013.01); *H04N 21/4627* (2013.01); *H04N 21/64322* (2013.01); *H04N 21/8586* (2013.01)

(58) Field of Classification Search
CPC ............. H04N 21/462; H04N 21/4622; H04N 21/4627; H04N 21/463; H04N 21/4821; H04N 21/64322
See application file for complete search history.

(56) References Cited

U.S. PATENT DOCUMENTS

| 8,739,196 | B2* | 5/2014 | Yao ..................... H04N 21/4662 725/14 |
| 9,521,386 | B2* | 12/2016 | Beattie, Jr ....... H04N 21/64322 |
| 9,767,317 | B1* | 9/2017 | Chakrovorthy ......... G06F 21/71 |
| 9,800,933 | B1* | 10/2017 | Strothmann ........... H04N 5/445 |
| 10,743,051 | B1* | 8/2020 | Reed ................ H04N 21/64322 |

(Continued)

OTHER PUBLICATIONS

"ShakaPlayer", Widevine website, https://www.widevine.com/solutions/shaka-player, Sep. 18, 2018 (Year: 2018).

*Primary Examiner* — Gigi L Dubasky

(57) ABSTRACT

A media client device may receive an electronic programming guide (EPG) including channel identifiers for a plurality of Quadrature Amplitude Modulation (QAM) channels and a plurality of Internet Protocol (IP) channels. The media client device may receive a first tuning request including a first channel identifier from the EPG, and may provide, to a second device, a first request for a source Universal Resource Locator (URL). The media client device may receive, from the second device, a source URL, wherein the source URL includes data indicating that the source URL corresponds to an IP channel and may provide the source URL to a third device via a first IP communication session. The media client device may receive via the first IP communication session, and from the third device, content segments associated with the IP channel and may provide, to a fourth device, the content segments for display.

20 Claims, 10 Drawing Sheets

(56) References Cited

U.S. PATENT DOCUMENTS

| | | |
|---|---|---|
| 2009/0031419 A1 | 1/2009 | Laksono |
| 2009/0055866 A1* | 2/2009 | Song ................... H04N 21/435 |
| | | 725/39 |
| 2009/0313663 A1 | 12/2009 | Kitazato et al. |
| 2011/0047566 A1 | 2/2011 | Matuchniak et al. |
| 2012/0011557 A1 | 1/2012 | Mathews et al. |
| 2012/0158985 A1 | 6/2012 | Patten et al. |
| 2014/0250471 A1* | 9/2014 | Guerra ............. H04N 21/43615 |
| | | 725/82 |
| 2014/0310518 A1 | 10/2014 | Giladi |
| 2015/0003614 A1 | 1/2015 | Cocchi et al. |
| 2015/0046939 A1 | 2/2015 | Oliver |
| 2015/0082351 A1* | 3/2015 | Kashyap ................ H04N 21/21 |
| | | 725/44 |
| 2016/0198214 A1* | 7/2016 | Levy .................. H04N 21/4345 |
| | | 725/43 |
| 2016/0212483 A1 | 7/2016 | Ansley |
| 2018/0041891 A1 | 2/2018 | Bleyl et al. |
| 2019/0207691 A1 | 7/2019 | Yamagishi |
| 2019/0215542 A1* | 7/2019 | Gandhi ................ H04N 21/234 |
| 2019/0253742 A1 | 8/2019 | Garten et al. |
| 2020/0037029 A1* | 1/2020 | He ...................... H04N 21/816 |

* cited by examiner

SYSTEMS AND METHODS FOR INTERNET PROTOCOL TUNING

BACKGROUND

Quadrature Amplitude Modulation (QAM) is the standard format by which digital cable television channels are encoded and transmitted via cable television service providers. In cable systems, a QAM tuner is linked to a cable in a manner that is equivalent to an Advanced Television Systems Committee (ATSC) tuner which is required to receive over-the-air (OTA) digital channels broadcast by local television stations when attached to an antenna.

DETAILED DESCRIPTION OF PREFERRED EMBODIMENTS

Figure 1A:
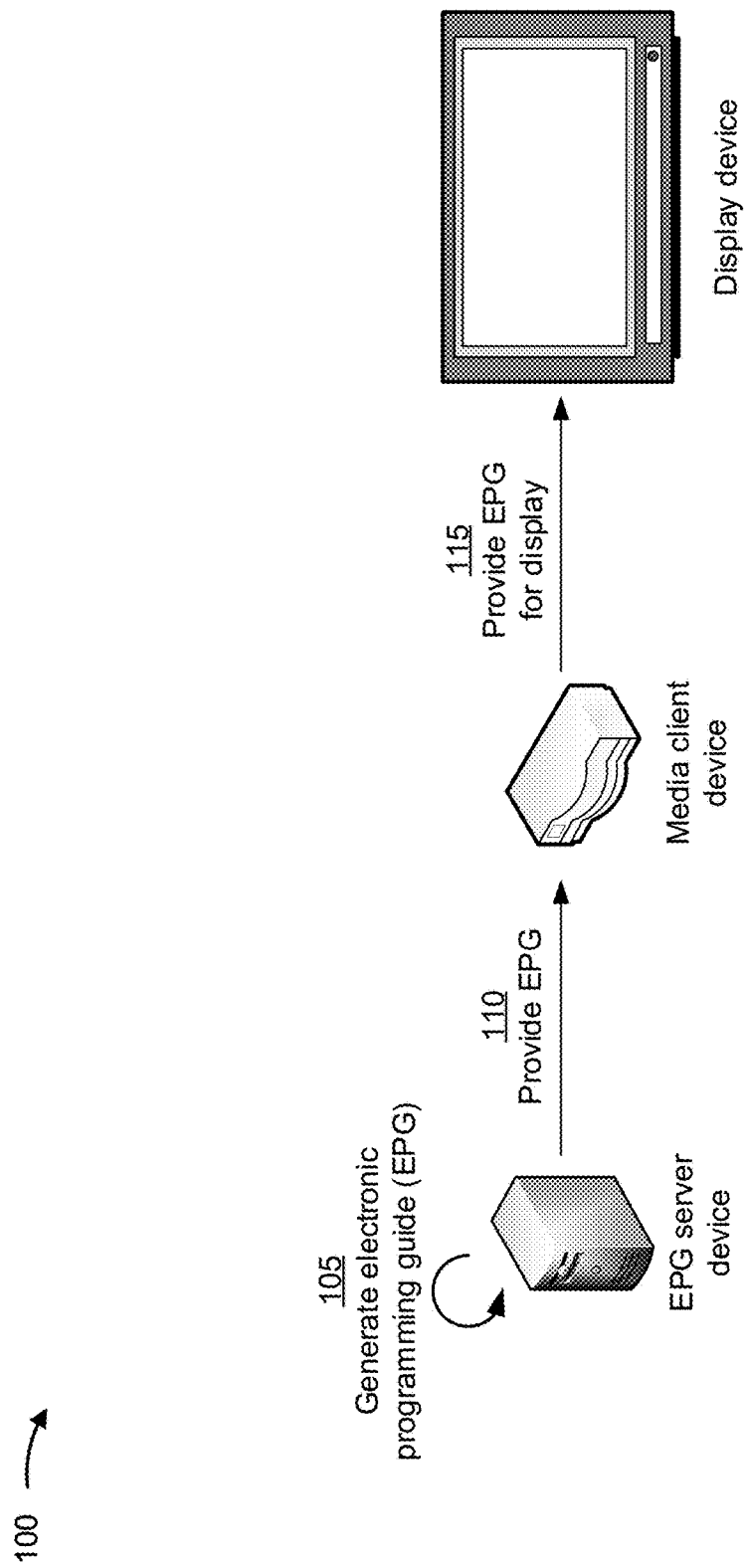
FIGS. 1A-1G are diagrams of one or more example implementations described herein.

The following detailed description of example implementations refers to the accompanying drawings. The same reference numbers in different drawings may identify the same or similar elements.

Television service providers may deliver digital television channels (e.g., linear video transmissions) to users via QAM channels or via Internet Protocol (IP) channels. For QAM-based television, the television service provider may transmit QAM signals over a network to a QAM-based set-top box (STB) at a user's location (e.g., the user's residence, the user's place of business, and/or the like), and the QAM-based STB may use an electronic programming guide (EPG) which lists the available digital television channels to permit the user to select a QAM channel for display on a display device (e.g., a television, a monitor, and/or the like). For IP television (IPTV), the television service provider may provide digital television channels over IP networks to an IP-based STB at the user's location, and the IP-based STB may use an EPG with available digital television channels to permit the user to select an IP channel for display on the display device. Current QAM-based STBs may not tune to IP channels, and current IP-based STBs may not tune to QAM channels. Thus, current STBs may not use an EPG with both QAM and IP channels and may not perform display of both types of channels, even though television service providers are capable of providing both types of channels.

Some implementations described herein provide a media client device that receives and/or uses an EPG that allows a user to display both QAM channels and IP channels. In some implementations, the media client device may receive an EPG that includes channel identifiers for QAM channels and IP channels. The media client device may provide an interactive media guide based on the EPG to a display device (e.g., a television, a monitor, a projector, and/or the like) for display, and receive a tuning request (e.g., from the display device, from a remote control associated with the media client device and/or the display device, and/or the like). The tuning request may include a channel identifier from the EPG, and the media client device may transmit and/or provide a request for a source Universal Resource Locator (URL) to a media server device (e.g., a middleware server, and/or the like), where the request includes the channel identifier and a device identifier for the media client device.

The media server device may verify that the media client device is permitted access to the channel and/or the content on the channel based on the channel identifier and device identifier. The media server device may then provide a source URL to the media client device, where the source URL includes data (e.g., a Boolean flag, and/or the like) indicating that the source URL corresponds to a QAM channel or an IP channel. If the data indicates that the source URL corresponds to a QAM channel, the media client device may initiate QAM tuning and display by receiving a QAM signal via the QAM channel, demodulating the QAM signal, de-encrypting the QAM signal, converting the QAM signal to an audio signal and/or a video signal, and providing the audio signal and/or the video signal to the display device.

If the data indicates that the source URL corresponds to an IP channel, the media client device may, using a browser application, provide the source URL to a content delivery network (CDN) via an IP communication session and may receive content segments associated with the IP channel via the IP communication session. The media client device may use a client (e.g., a Motion Picture Experts Group—Dynamic Adaptive Streaming of Hypertext Transfer Protocol (MPEG-DASH) client, and/or the like) and/or a player (e.g., a dashjs player, a Shaka player, and/or the like) embedded in the browser to play the content provided via the IP channel, and may provide the content to the display device. In this way, the media client device may receive and/or use an EPG that includes QAM channels and IP channels and obtain content via QAM channels and IP channels for display. Thus, the media client device may obviate the need for two separate STBs, one for QAM channels and one for IP channels. Additionally, or alternatively, the media client device has expanded capability and improved operations as compared to STBs. In some implementations, installation and operation of the media client device requires fewer cable connections (e.g., to the display device, and/or the like) and/or wireless connections than using two STBs. Additionally, or alternatively, operating the media client device, as compared to two STBs, is more efficient and conserves computing resources (e.g., processing resources, memory resources, power resources, communication resources, and/or the like) and/or network resources.

FIGS. 1A-1G are diagrams of one or more example implementations 100 described herein. For example, as shown in FIGS. 1A-1G, example implementation(s) 100 includes an EPG server device, a media client device, a display device, a media server device, a content delivery network, and/or a digital rights management server device.

In some implementations, a television service provider may install and/or otherwise provide the media client device (e.g., one or more media client devices) to a user (e.g., a customer, an individual, a business, and/or the like) at a location of the user (e.g., a house, an apartment, a business office, and/or the like). The media client device may connect to the display device (e.g., via a High Definition Multimedia Interface (HDMI) cable, a component video cable, a Radio Corporation of America (RCA) cable, a Super Video (S-Video) cable, a digital optical cable, a coaxial cable, a wireless connection, and/or the like). The media client device may also connect to a router, which may connect through an optical network termination (ONT) to an optical network over which the television service provider may transmit signals (e.g., QAM signals, IP signals, and/or the like) providing video broadcast (linear) services, IP services, Video-On-Demand (VoD) services, and/or the like. Additionally, or alternatively, the media client device may connect to another media client device (e.g., via an in-home network, a business network, a multimedia over coax alliance (MoCA), and/or the like) and/or the router to connect to the optical network.

In some implementations, the media client device may connect through the optical network to the EPG server device (e.g., when the media client device boots, when the media client device is reset, and/or the like). As shown in FIG. 1A, and by reference number 105, the EPG server device may generate an EPG that includes channel identifiers for QAM channels and IP channels. The EPG server device may generate the EPG based on information provided by the television service provider, information regarding the media client device (e.g., a device identifier, a version of software installed on the media client device, and/or the like), a location of the media client device, and/or the like.

As shown in FIG. 1A, and by reference number 110, the EPG server device may provide the EPG to the media client device. In some implementations, the EPG server device may provide the EPG to the media client device during a bootup process for the media client device. In some implementations, the EPG server device may provide the EPG to the media client device after updating the EPG (e.g., to reflect changes to the channel identifiers provided by the television service provider, to reflect changes in programming on the QAM channels and the IP channels, and/or the like). For example, the EPG server may provide periodic updates to the EPG to the media client device.

In some implementations, the media client device may provide and receive information from the EPG server device via a middleware layer of software running on the media client device. For example, the media client device may include a platform layer, a middleware layer, and/or an application layer. The platform layer may communicate and/or interface with the hardware of the media client device and the middleware layer. The middleware layer may communicate with the platform layer and the application layer. The application layer may include one or more applications (e.g., apps, web browsers, and/or the like).

As shown in FIG. 1A, and by reference number 115, the media client device may provide the EPG to the display device for display. In some implementations, the media client device may provide an interactive media guide based on the EPG to the display device. For example, the middleware layer on the media client device may process the EPG to create an interactive media guide to assist a user of the display device with accessing the information in the EPG. In some implementations, the EPG server may provide the interactive media guide and the EPG to the media client device.

Figure 1B:
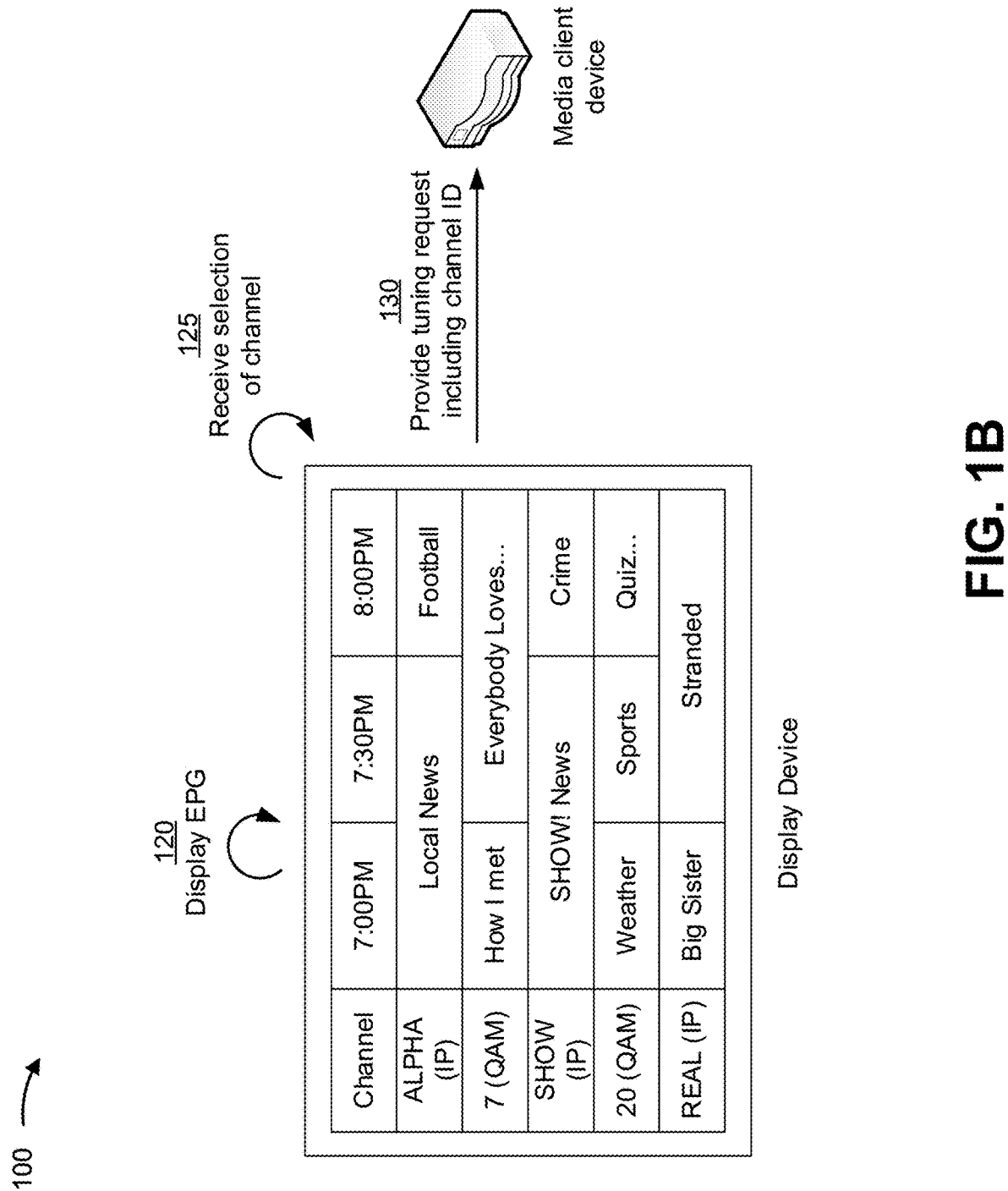

As shown in FIG. 1B, and by reference number 120, the display device may display the EPG. In some implementations, the displayed EPG may include a grid that provides information regarding content available on QAM channels and IP channels at a given time. For example, and as shown in FIG. 1B, the displayed EPG may indicate that the local news is available on channel "ALPHA" from 7:00 PM to 8:00 PM. In some implementations, the displayed EPG may include a visual indicator for whether a given channel is a QAM channel or an IP channel. For example, and as shown in FIG. 1B, the displayed EPG may indicate that channel "ALPHA" is an IP channel and that channel "7" is a QAM channel. In this way, the media client device may receive an EPG that includes QAM channels and IP channels, which may then be displayed by the display device.

As shown in FIG. 1B, and by reference number 125, the display device may receive a selection of a channel. In some implementations, the display device may receive the selection of the channel via an input button (e.g., a physical button on the display device, a physical button on a remote control associated with the display device, a virtual button on a touchscreen of the display device, and/or the like), a voice command (e.g., received via a microphone and/or the like), and/or the like. As shown in FIG. 1B, and by reference number 130, the display device may provide, to the media client device, a tuning request including a channel identifier (channel ID) based on the received selection of the channel.

In some implementations, the media client device may receive the selection of the channel. For example, the media client device may receive the selection of the channel via an input button (e.g., a physical button on the media client device, a physical button on a remote control associated with the media client device, and/or the like), a voice command (e.g., received via a microphone and/or the like), and/or the like. In some implementations, the media client device may generate a tuning request including a channel identifier (channel ID) based on the received selection of the channel. For example, the middleware layer of the media client device may generate the tuning request.

Figure 1C:
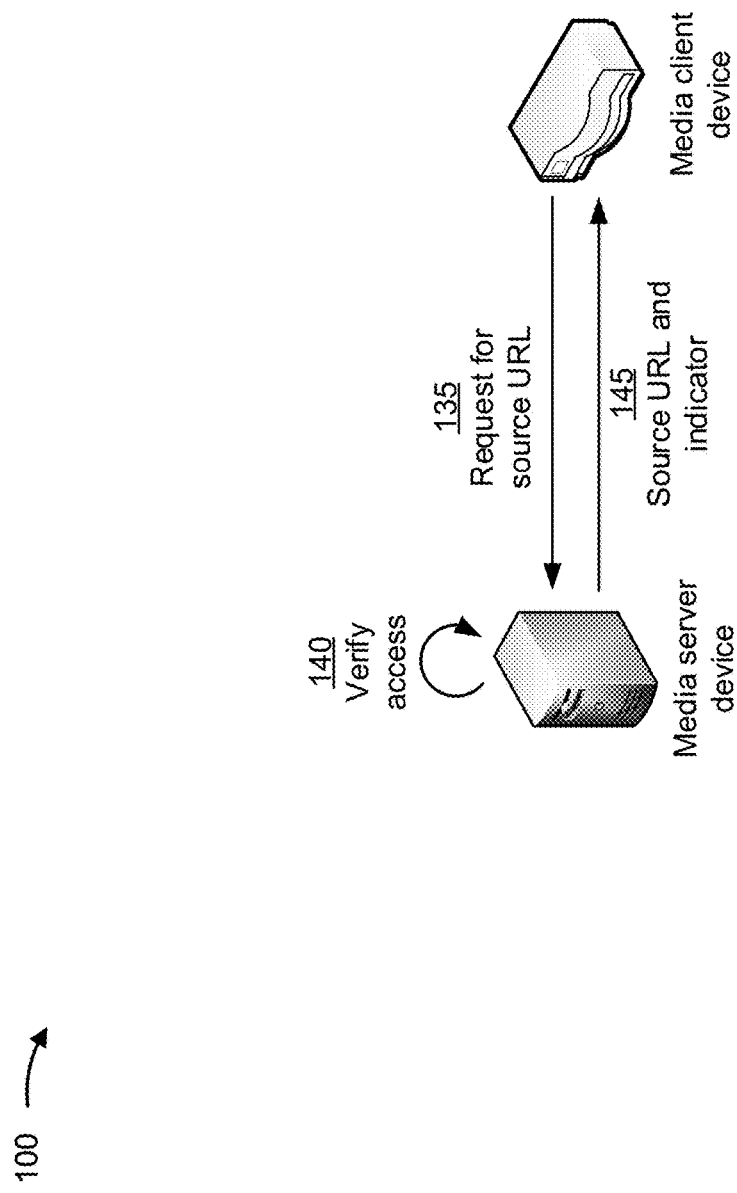

As shown in FIG. 1C, and by reference number 135, the media client device (e.g., via the middleware layer) may provide, based on the tuning request, a request for a source URL to the media server device (e.g., a middleware server device, and/or the like). The request for the source URL may include the channel identifier and the device identifier of the media client device. In some implementations, the device identifier may include a serial number of the media client device, an account identifier associated with the user, a unique identifier and/or the like used by the television service provider to identify media client device, and/or the like.

As shown in FIG. 1C, and by reference number 140, the media server device may process the channel identifier and the device identifier to verify that the media client device is authorized to access the selected channel and/or content provided on the selected channel. In some implementations, the media server device compares the channel identifier and/or the device identifier with information in a data structure (e.g., a data structure maintained by the television service provider) to verify access for the media client device. For example, the media server device may determine whether a package of channels purchased and/or subscribed to by the user of the media client device includes the selected channel, whether a promotion permits the user of the media client device to access the selected channel, and/or the like. In the description to follow, it will be assumed that the media client device has been verified to have access to the selected channel.

As shown in FIG. 1C, and by reference number 145, the media server device may provide, to the media client device, a source URL corresponding to the channel identifier and an indication of whether the channel is a QAM channel or an IP channel. In some implementations, the media server device may provide, to the media client device, a tokenized source URL that is uniquely tokenized to the media client device (e.g., based on a device token specific to the media client device, the device identifier of the media client device, and/or the like). For example, the media server device may validate the tokenized source URL to play for a given duration of time (e.g., an hour, a duration of the content on the channel, and/or the like) to maintain the ability of the media client to access the IP channel. In this way, the media server device, using the tokenized source URL, may protect a stream of content on the IP channel to the media client device from attempts to impermissibly obtain the stream of content.

In some implementations, the media server device may provide, to the media client device, the indication as data included in the source URL indicating whether the source URL corresponds to an IP channel. For example, the data may be a Boolean flag that returns a value of "True" if the source URL corresponds to an IP channel and "False" if the source URL corresponds to a QAM channel, or vice versa. In some implementations, the data indicating whether the source URL corresponds to an IP channel may be any type and/or form of data and may be included in the source URL, embedded in the source URL, provided with the source URL (e.g., as an additional piece of data), and/or the like.

In some implementations, the media client device (e.g., via the middleware layer) may determine whether the selected channel is a QAM channel or an IP channel based on the flag provided by the media server device. If the flag indicates that the source URL corresponds to a QAM channel, the media client device may initiate QAM channel display by receiving content in a QAM signal via the QAM channel, demodulating the QAM signal, de-encrypting the QAM signal, converting the QAM signal to an audio signal and/or a video signal, and providing the audio signal and/or the video signal to the display device. In some implementations, the middleware layer of the media client device may initiate, coordinate, and/or control QAM channel display. For example, the media client device may include one or more QAM tuners and the middleware layer of the media client device may use the one or more QAM tuners to initiate, coordinate, and/or control QAM channel display.

Figure 1D:
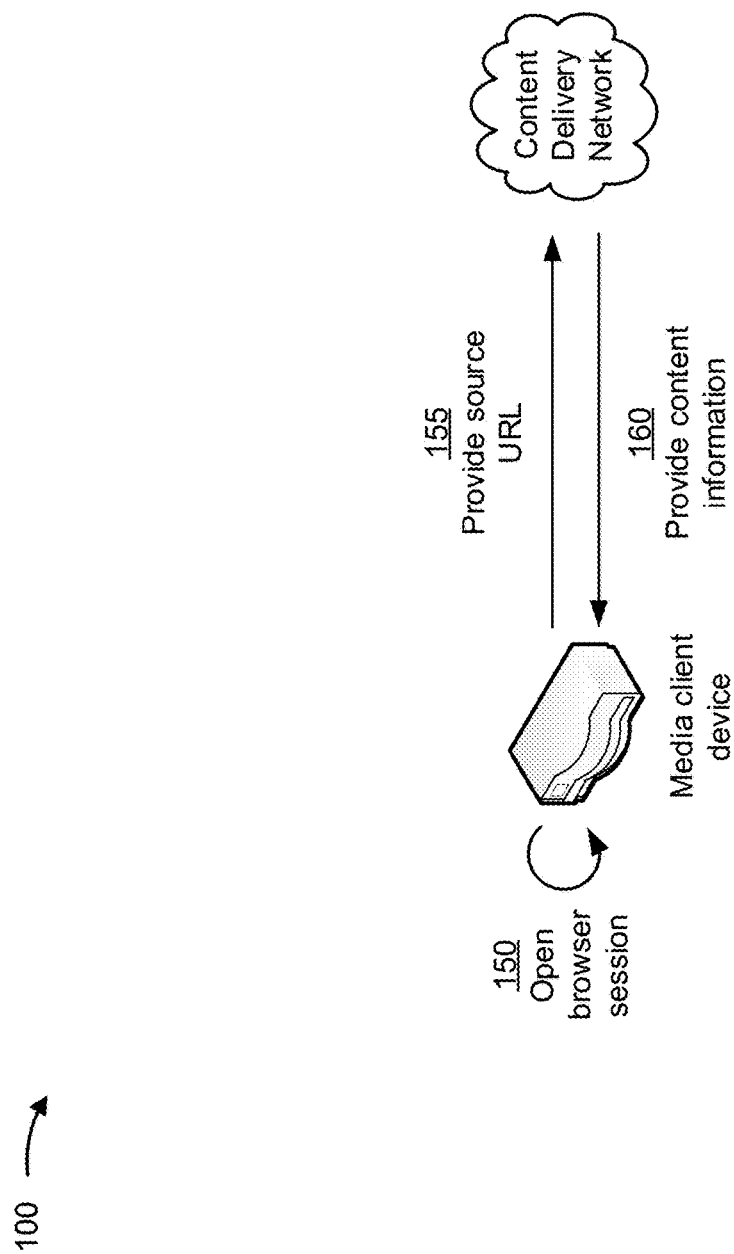

In some implementations, the media client device (e.g., via the middleware layer) may determine that the selected channel is an IP channel based on the flag provided by the media server device and (e.g., using the application layer) initiate, coordinate, and/or control streaming of the IP channel. As shown in FIG. 1D, and by reference number 150, the media client device may open a browser session. For example, the media client device may open a browser session using a browser (e.g., an application used to access a website, and/or the like), an app, and/or the like. In some implementations, the browser session may establish an IP communication session with one or more servers.

As shown in FIG. 1D, and by reference number 155, the media client device (e.g., using the browser) may provide the source URL to the content delivery network. In some implementations, the media client device may provide the source URL via the IP communication session. For example, the media client device, using the browser, may establish a Media Source Extensions (MSE) session with the content delivery network. In some implementations, the MSE session may permit a JavaScript application to send byte streams to media codecs within the browser and/or allow the implementation of client-side prefetching and buffering of code for streaming media (e.g., the content) entirely in JavaScript.

In some implementations, the content delivery network may be a network and/or system of distributed servers that deliver webpages and other web content to media client devices, based on the geographic locations of the media client devices, the origin of a webpage and/or content being accessed, and/or the geographic location of a content delivery server device in the content delivery network providing the webpage and/or content. For example, the content delivery network may include a network of servers geographically distributed and owned and/or operated by the television service provider.

As shown in FIG. 1D, and by reference number 160, the content delivery network may provide, to the media client device, content information, such as a header, whether playing the content requires a license, and/or the like. In some implementations, the content delivery network may provide the content information via the IP communication session (e.g., the MSE session). For example, the media client device (e.g., via the application layer) may use a Hypertext Transfer Protocol (HTTP) to download the content information and/or content from the content delivery network.

Figure 1E:
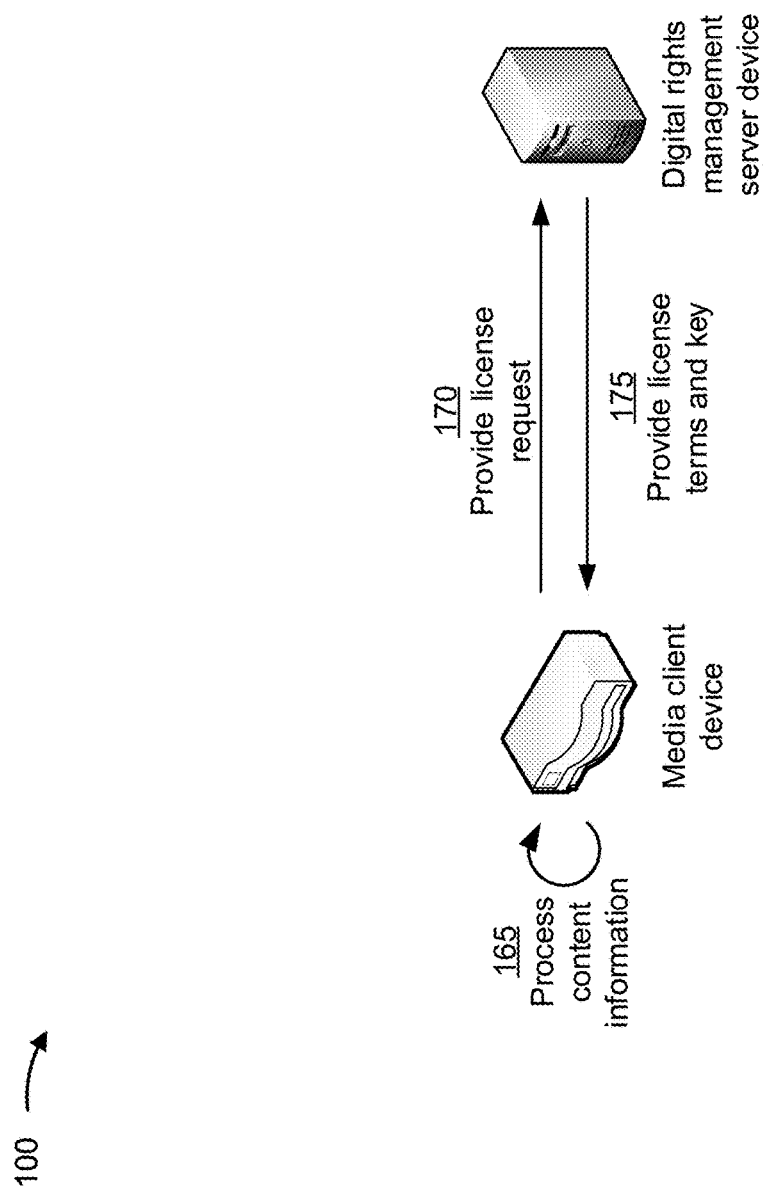

As shown in FIG. 1E, and by reference number 165, the media client device may process the content information (e.g., via the application layer, using the browser, and/or the like). In some implementations, the media client device may process the content information to determine whether playing the content requires a license. In some implementations, if the media client device determines that playing the content does not require a license, the media client may continue to download the content from the content delivery network.

In some implementations, the media client device may determine that playing the content does require a license, and may, as shown in FIG. 1E, and by reference number 170, provide a license request to the digital rights management server device. For example, the license request may include information regarding the content, the device identifier, and/or the like. In some implementations, the media client device may provide the license request to the digital rights management server device via an IP communication session.

For example, the media client device (e.g., via the application layer, using the browser, and/or the like) may establish an Encrypted Media Extensions (EME) session with the digital rights management server device. In some implementations, the EME session may provide a communication channel between the browser and digital rights management software on the digital rights management server device. The EME session may allow the use of HTML5 (the fifth major revision of Hypertext Markup Language (HTML)) video to play digital-rights-management-wrapped content without the using third-party media plugins and may enable adaptive bitrate streaming in HTML5 (e.g., using MPEG-DASH, and/or the like) with Motion Picture Experts Group Common Encryption (MPEG-CENC) protected content.

As shown in FIG. 1E, and by reference number 175, the digital right management server device may provide license terms and one or more keys to the media client device. In some implementations, the license terms may include a time period during which the media client device may access, play, and/or store the content, a number of times the media client device may access, play, and/or store the content, permission for the media client device to transmit the content to another media client device, and/or the like. The one or more keys may permit the media client device to access and/or decrypt encrypted content (e.g., MPEG-CENC protected content, and/or the like). In some implementations, the digital right management server device may provide license terms and one or more keys to the media client device via an IP communication session, such as an EME session.

Figure 1F:
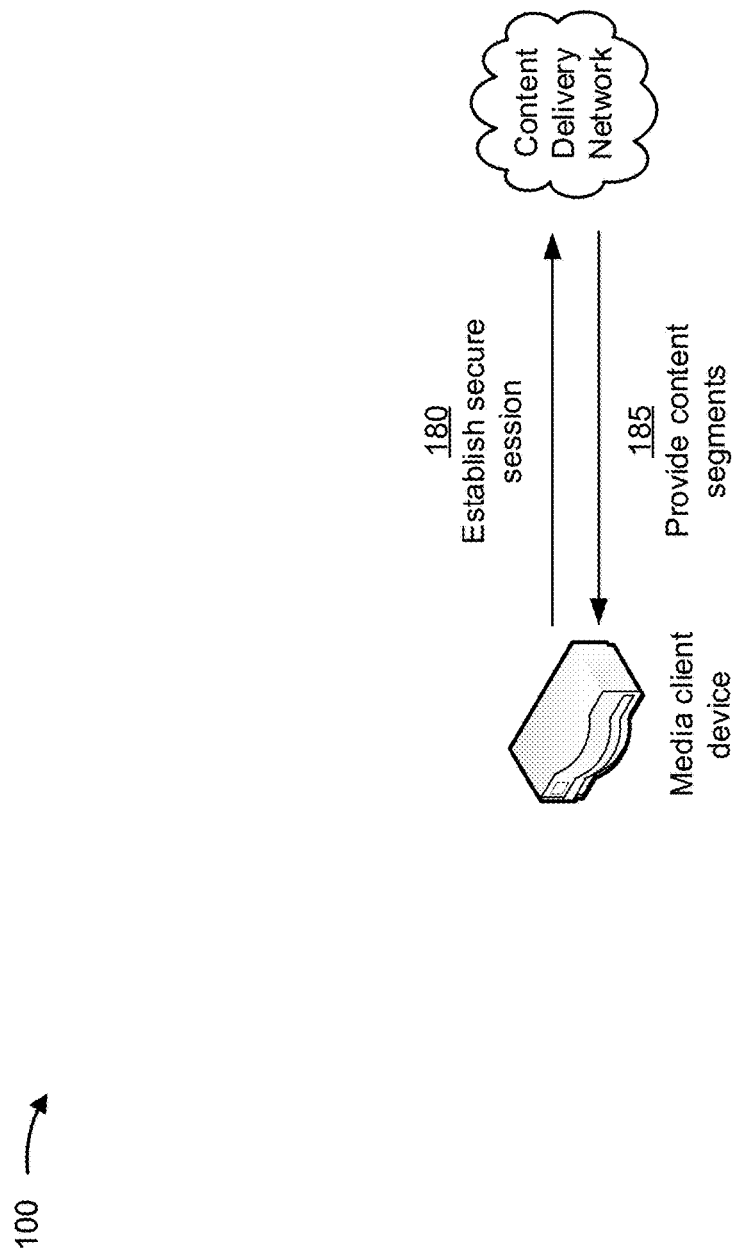

As shown in FIG. 1F, and by reference number 180, the media client device may establish a secure session with the content delivery network (e.g., via an IP communication session). In some implementations, the media client device (e.g., via the application layer, using the browser, and/or the like) may use Hypertext Transfer Protocol Secure (HTTPS) to communicate with the content delivery network and establish the secure session. In some implementations, the media client device may use a client (e.g., an MPEG-DASH client, and/or the like) and/or a player (e.g., a dashjs player, a Shaka player, and/or the like) embedded in the browser to establish the secure session.

As shown in FIG. 1F, and by reference number 185, the content delivery network may provide content segments to the media client device via the secure session. In some implementations, the media client device may use an MPEG-DASH client and/or a player to download and/or stream the content segments.

Figure 1G:
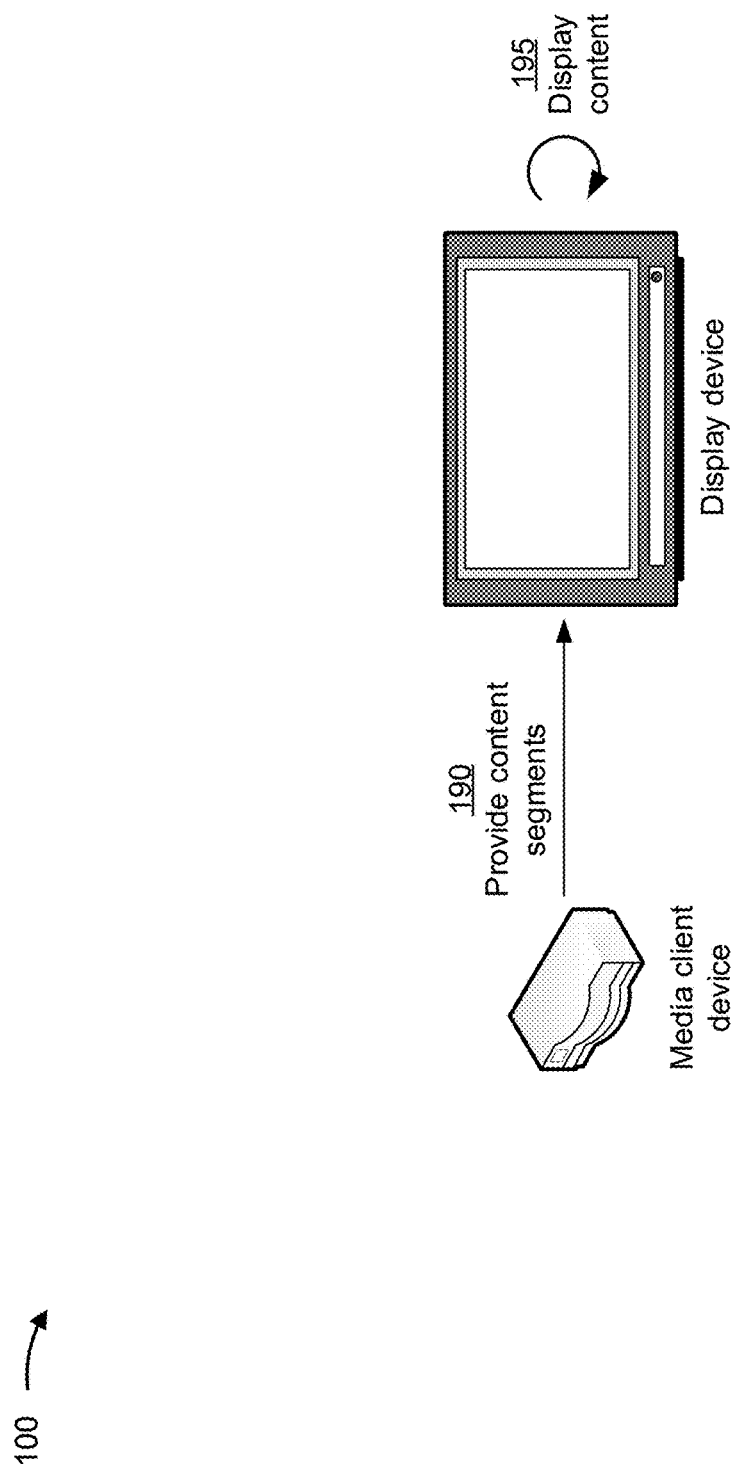

As shown in FIG. 1G, and by reference number 190, the media client device may provide the content segments to the display device. In some implementations, the media client device may use the player embedded in the browser to stream the content segments to the display device.

As shown in FIG. 1G, and by reference number 195, the display device may display the content. In some implementations, the display device and/or the media client device may receive interactions from the user (e.g., via a remote control, voice command, and/or the like) to control, adjust, change, and/or the like the manner in which the content segments are displayed, streamed, stored, and/or the like. For example, the user may send a command to the display device and/or the media client device to fast-forward, rewind, pause, restart, and/or the like the content, and the media client device may change the stream of content segments accordingly.

In some implementations, the media client device may open a second, third, and/or any number of instances of the player embedded in the browser to concurrently stream content over multiple IP channels. For example, the media client device may concurrently stream content over multiple IP channels and provide the streams of media content to the display device for display in different portions of the display device. Additionally, or alternatively, the media client device may provide one or more streams of media content to the display device for display and concurrently store one or more other streams of media content for playback at another time. In some implementations, the media client device may be connected to multiple display devices and may provide one or more streams of media content to each of the multiple display devices (e.g., the same streams of media content to each of the multiple display devices, different streams of media content to each of the multiple display devices, and/or the like).

Additionally, or alternatively, the media client device may concurrently play one or more QAM channels and one or more IP channels. For example, the media client device (e.g., using the middleware layer) may play and/or store content from one or more QAM channels and (e.g., using the application layer, the browser, the player, and/or the like) may play and/or store content from one or more IP channels.

In this way, the media client device may receive and/or use an EPG that includes QAM channels and IP channels and obtain content via QAM channels and IP channels for display.

As indicated above, FIGS. 1A-1G are provided as one or more examples. Other examples can differ from what is described with regard to FIGS. 1A-1G.

Figure 2:
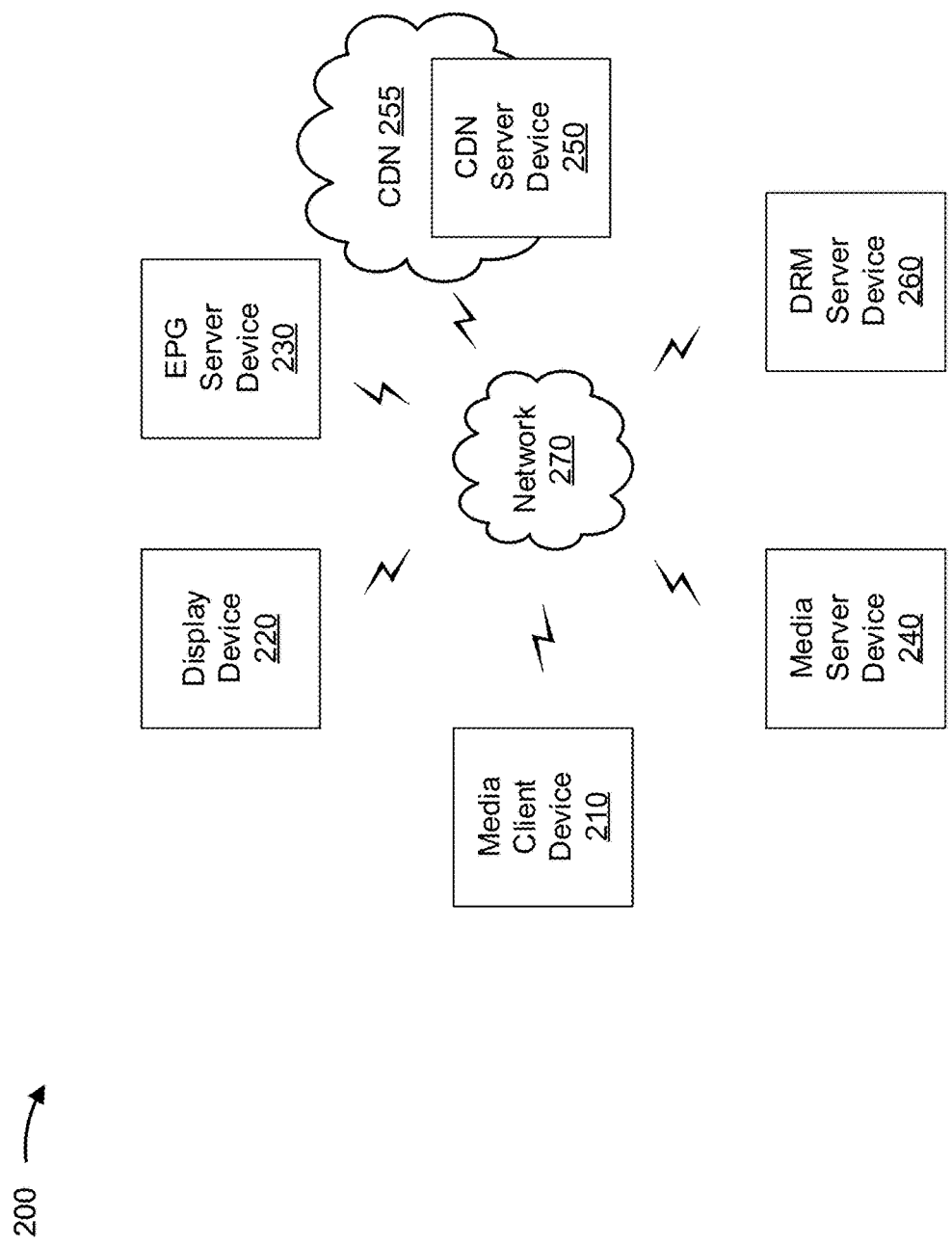
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a media client device 210, a display device 220, an EPG server device 230, a media server device 240, a content delivery network (CDN) server device 250, a CDN 255, a digital rights management (DRM) server device 260, and a network 270. Devices of environment 200 may interconnect via wired connections, wireless connections, or a combination of wired and wireless connections.

Media client device 210 includes one or more devices capable of receiving, transmitting, and/or processing multimedia content and providing the multimedia content to a user (e.g., via display device 220). Examples of media client device 210 may include a set-top box, a casting stick (e.g., a high-definition media interface (HDMI) dongle), a computer, a cable card, a gaming device, a portable electronic device, and/or another type of device capable of receiving, transmitting, and/or processing multimedia content and providing the multimedia content to a user.

Display device 220 includes any digital or analog display that is capable of presenting audio and/or video content provided by media client device 210. Display device 220 may include technologies, such as cathode ray tube (CRT) displays, liquid crystal displays (LCDs), light-emitting diode (LED) displays, plasma displays, and/or the like. Examples of display device 220 may include a television, a projector, a computer monitor, and/or another type of device capable of presenting audio and/or video content.

EPG server device 230 includes one or more devices capable of receiving, generating, storing, processing, and/or providing information associated with television service providers, EPGs, channel identifiers, device identifiers, and/or the like. Examples of EPG server device 230 may include a server device (e.g., connected to a data structure storing EPGs) operated by the television service provider, a network of computing devices and/or server devices (e.g., connected to a data structure storing information) operated by the television service provider, and/or the like. In some implementations, EPG server device 230 may include a communication interface that allows EPG server device 230 to receive information from and/or transmit information to other devices in environment 200.

Media server device 240 includes one or more devices capable of receiving, generating, storing, processing, and/or providing information associated with television service providers, channel identifiers, source URLs, device identifiers, channel packages, user subscriptions, promotions, and/or the like. Examples of media server device 240 may include a server device (e.g., connected to a data structure storing information) operated by the television service provider and/or a manufacturer of the media client device, a network of computing devices and/or server devices (e.g., connected to a data structure storing information) operated by the television service provider and/or the manufacturer of the media client device, and/or the like. In some implementations, media server device 240 may include a communication interface that allows media server device 240 to receive information from and/or transmit information to other devices in environment 200.

CDN server device 250 includes one or more devices capable of receiving, generating, storing, processing, and/or providing information associated with multimedia content, television service providers, channel identifiers, source URLs, and/or device identifiers. Examples of CDN server device 250 may include a server device (e.g., connected to a data structure storing information) operated by the television service provider and/or a content provider, a network of computing devices and/or server devices (e.g., connected to a data structure storing information) operated by the television service provider and/or the content provider, and/or the like. In some implementations, CDN server device 250 may include a communication interface that allows CDN server device 250 to receive information from and/or transmit information to other devices in environment 200.

CDN 255 includes one or more networks (e.g., wired and/or wireless networks), data centers, server devices (e.g., CDN server device 250), and/or the like capable of receiving, generating, storing, processing, and/or providing information associated with multimedia content, television service providers, channel identifiers, source URLs, and/or device identifiers.

DRM server device 260 includes one or more devices capable of receiving, generating, storing, processing, and/or providing information associated with multimedia content, television service providers, licenses, encryption keys, and/or the like. Examples of DRM server device 260 may include a server device (e.g., connected to a data structure storing information) operated by the television service provider and/or a digital rights management service provider, a network of computing devices and/or server devices (e.g., connected to a data structure storing information) operated by the television service provider and/or the digital rights management service provider, and/or the like. In some implementations, DRM server device 260 may include a communication interface that allows DRM server device 260 to receive information from and/or transmit information to other devices in environment 200.

Network 270 includes one or more wired and/or wireless networks. For example, network 270 may include a fiber optic-based network, an intranet, the Internet, a cloud computing network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
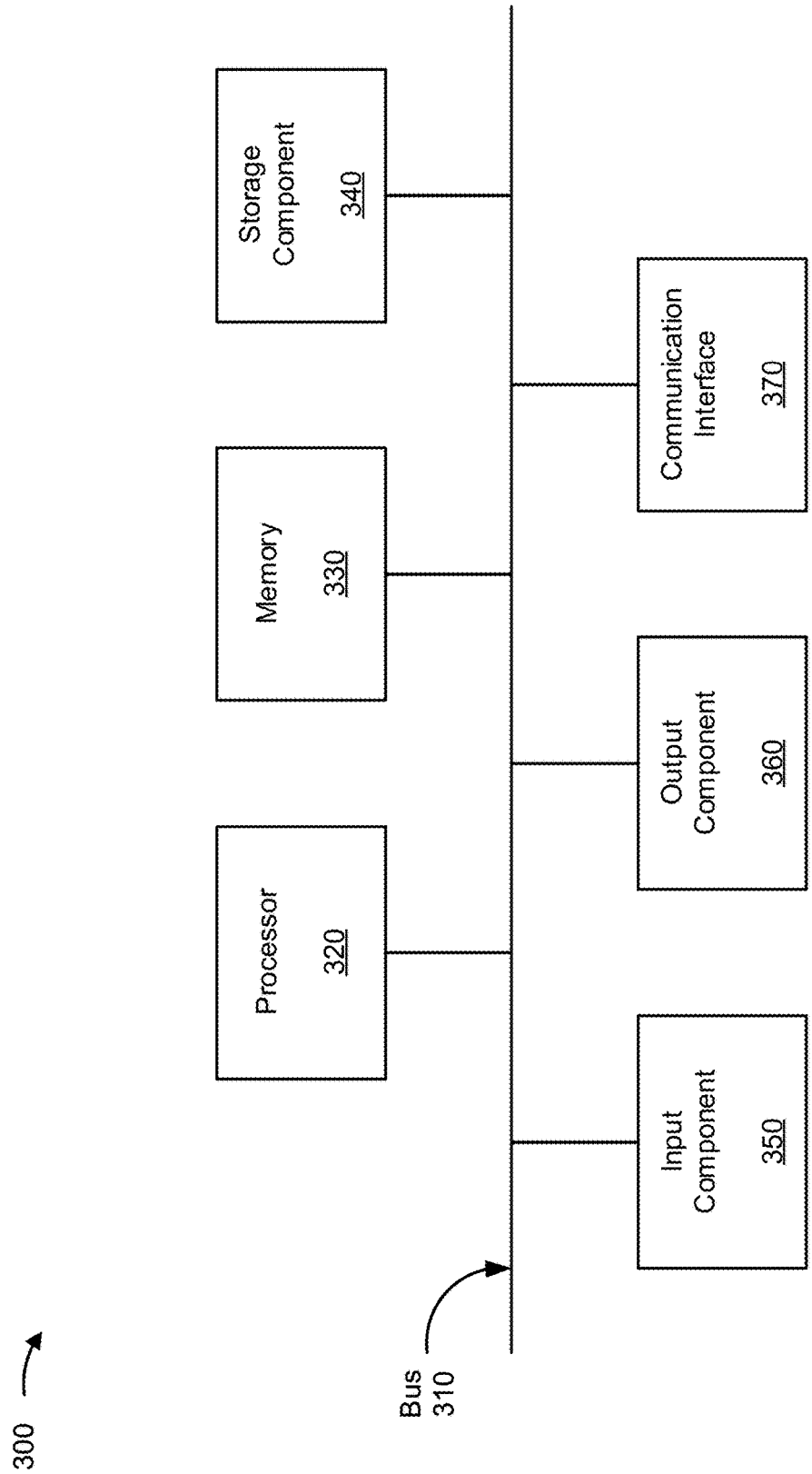
FIG. 3 is a diagram of example components of one or more devices of FIG. 2.

FIG. 3 is a diagram of example components of a device 300. Device 300 may correspond to media client device 210, display device 220, EPG server device 230, media server device 240, CDN server device 250, and/or DRM server device 260. In some implementations, media client device 210, display device 220, EPG server device 230, media server device 240, CDN server device 250, and/or DRM server device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
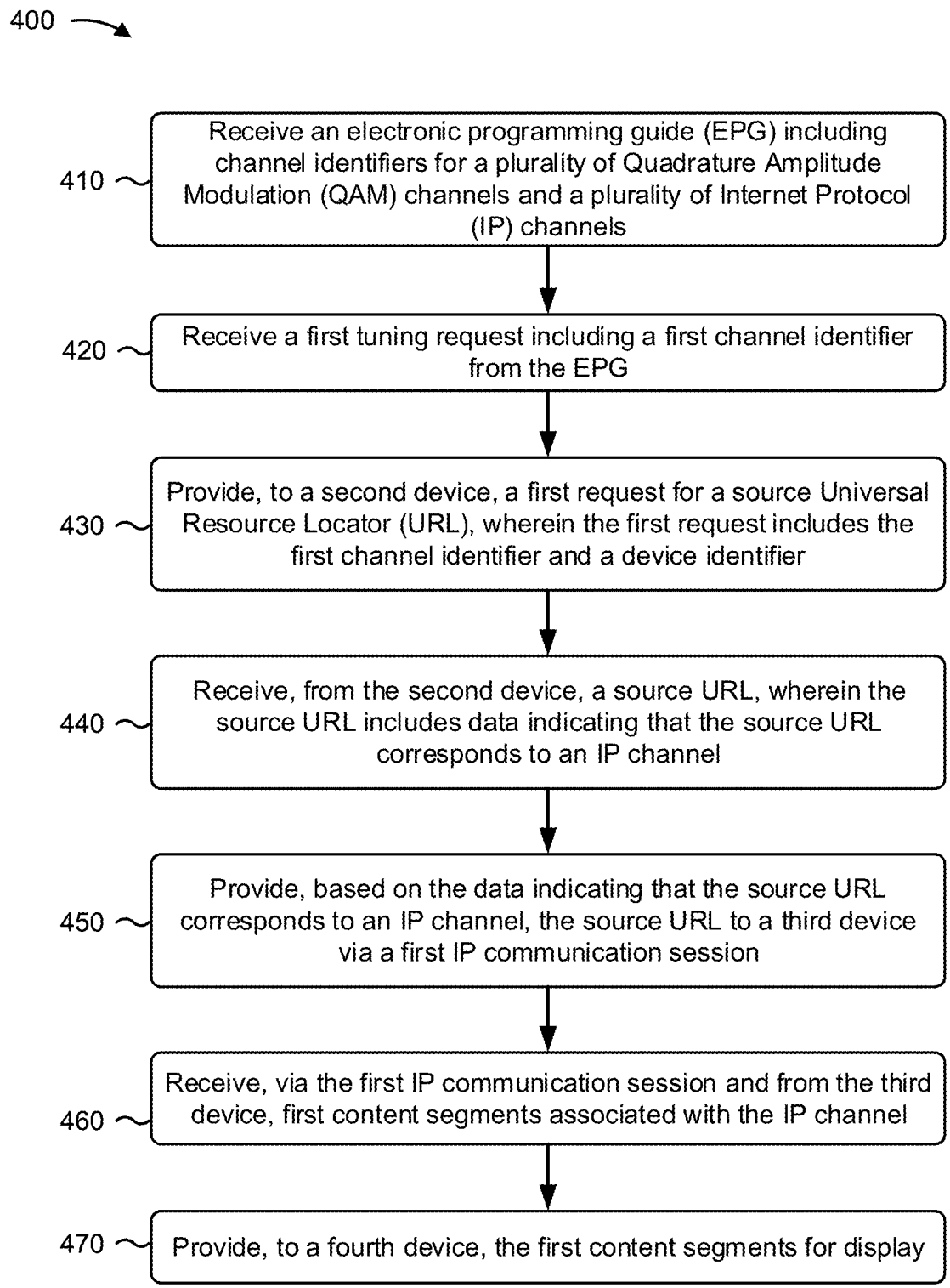
FIG. 4 is a flow chart of an example process for receiving an electronic programming guide (EPG) for QAM channels and Internet Protocol (IP) channels, tuning to an IP channel, and receiving content via the IP channel.

FIG. 4 is a flow chart of an example process 400 for receiving an EPG for QAM channels and IP channels, tuning to an IP channel, and receiving content via the IP channel. In some implementations, one or more process blocks of FIG. 4 may be performed by a first device (e.g., media client device 210). In some implementations, one or more process blocks of FIG. 4 may be performed by another device or a group of devices separate from or including the first device, such as a display device (e.g., display device 220), an EPG server device (e.g., EPG server device 230), a media server device (e.g., media server device 240), a CDN server device (e.g., CDN server device 250), a DRM server device (e.g., DRM server device 260), and/or the like.

As shown in FIG. 4, process 400 may include receiving an electronic programming guide (EPG) including channel identifiers for a plurality of Quadrature Amplitude Modulation (QAM) channels and a plurality of Internet Protocol (IP) channels (block 410). For example, the first device (e.g., using processor 320, memory 330, storage component 340, input component 350, output component 360, communication interface 370, and/or the like) may receive an EPG including channel identifiers for a plurality of QAM channels and a plurality of IP channels, as described above. In some implementations, the first device may include at least one QAM tuner (e.g., at least two QAM tuners, at least four QAM tuners, at least six QAM tuners, and/or at least seven QAM tuners).

As further shown in FIG. 4, process 400 may include receiving a first tuning request including a first channel identifier from the EPG (block 420). For example, the first device (e.g., using processor 320, memory 330, storage component 340, input component 350, output component 360, communication interface 370, and/or the like) may receive a first tuning request including a first channel identifier from the EPG, as described above.

As further shown in FIG. 4, process 400 may include providing, to a second device, a first request for a source Universal Resource Locator (URL) wherein the first request includes the first channel identifier and a device identifier for the first device (block 430). For example, the first device (e.g., using processor 320, memory 330, storage component 340, input component 350, output component 360, communication interface 370, and/or the like) may provide, to a second device, a first request for a source URL, as described above. In some implementations, the first request includes the first channel identifier and a device identifier for the first device.

As further shown in FIG. 4, process 400 may include receiving, from the second device, a source URL wherein the source URL includes data indicating that the source URL corresponds to an IP channel (block 440). For example, the first device (e.g., using processor 320, memory 330, storage component 340, input component 350, output component 360, communication interface 370, and/or the like) may receive, from the second device, a source URL, as described above. In some implementations, the source URL includes data indicating that the source URL corresponds to an IP channel. For example, the data indicating that the source URL corresponds to an IP channel may include a Boolean flag.

As further shown in FIG. 4, process 400 may include providing, based on the data indicating that the source URL corresponds to an IP channel, the source URL to a third device via a first IP communication session (block 450). For example, the first device (e.g., using processor 320, memory 330, storage component 340, input component 350, output component 360, communication interface 370, and/or the like) may provide (e.g., via a browser application on the first device, where the browser application runs a Motion Picture Experts Group—Dynamic Adaptive Streaming of Hypertext Transfer Protocol (MPEG-DASH) client), based on the data indicating that the source URL corresponds to an IP channel, the source URL to a third device via a first IP communication session (e.g., a Media Source Extensions (MSE) session and/or the like), as described above. In some implementations, a browser application may establish the first IP communication session. In some implementations, the browser application may run an MPEG-DASH client including a dashjs player and/or a Shaka player.

As further shown in FIG. 4, process 400 may include receiving, via the first IP communication session and from the third device, first content segments associated with the IP channel (block 460). For example, the first device (e.g., using processor 320, memory 330, storage component 340, input component 350, output component 360, communication interface 370, and/or the like) may receive, via the first IP communication session and from the third device, first content segments associated with the IP channel, as described above.

As further shown in FIG. 4, process 400 may include providing, to a fourth device, the first content segments for display (block 470). For example, the first device (e.g., using processor 320, memory 330, storage component 340, input component 350, output component 360, communication interface 370, and/or the like) may provide, to a fourth device, the first content segments for display, as described above.

In another example, process 400 may include providing, based on information regarding the content segments, a license request to a fifth device via a second IP communication session (e.g., an Encrypted Media Extensions (EME) session and/or the like) and receiving, from the fifth device, a license and a key to access the content segments.

In yet another example, process 400 may include receiving, from the third device, second content segments via a second IP communication session established based on a second tuning request including a second channel identifier from the EPG, where the first device receives at least a portion of the first content segments and at least a portion of the second content segments concurrently. Process 400 may include establishing the second IP communication session based on the second tuning request including the second channel identifier from the EPG.

In yet another example, process 400 may include receiving a second tuning request including a second channel identifier from the EPG, receiving a second source URL, where the second source URL includes data indicating that the second source URL corresponds to a QAM channel, and tuning, based on the data indicating that the second source URL corresponds to a QAM channel, to the QAM channel using the second source URL via a QAM communication session.

In yet another example, process 400 may include when providing the first request for a source URL, providing the first request for a source URL via middleware, when receiving the source URL, receiving the source URL via the middleware, and, when providing the source URL, providing the source URL via a browser application.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first device, an electronic programming guide (EPG) including a plurality of channel identifiers for a plurality of Quadrature Amplitude Modulation (QAM) channels and a plurality of Internet Protocol (IP) channels;
   receiving, by the first device, a first tuning request including a first channel identifier, of the plurality of channel identifiers, from the EPG;
   receiving, by the first device and from a second device, a first source Universal Resource Locator (URL),
   wherein the first source URL includes data indicating that the first source URL corresponds to an IP channel, of the plurality of IP channels, wherein the data indicating that the first source URL corresponds to the IP channel includes a first Boolean flag having a first value;
   tuning, by the first device and based on the data indicating that the first source URL corresponds to the IP channel, to the IP channel using the first source URL via an IP communication session;
   receiving, by the first device and via the IP communication session, first content segments associated with the IP channel;
   receiving, by the first device, a second tuning request including a second channel identifier, of the plurality of channel identifiers, from the EPG;
   receiving, by the first device, a second source URL,
   wherein the second source URL includes data indicating that the second source URL corresponds to a QAM channel, of the plurality of QAM channels, wherein the data indicating that the second source URL corresponds to the QAM channel includes a second Boolean flag having a second value;

tuning, by the first device and based on the data indicating that the second source URL corresponds to the QAM channel, to the QAM channel using the second source URL via a QAM communication session;

receiving, by the first device and via the QAM communication session, second content segments associated with the QAM channel, wherein at least a portion of the second content segments are received concurrently with at least a portion of the first content segments; and providing, by the first device and to a third device, the first content segments and the second content segments for display.

2. The method of claim 1, wherein the IP communication session includes a Media Source Extensions (MSE) session.

3. The method of claim 1, further comprising:

providing, based on information regarding the first content segments, a license request to a fourth device via another IP communication session; and receiving, from the fourth device, a license and a key to access the first content segments.

4. The method of claim 3, wherein the other IP communication session includes an Encrypted Media Extensions (EME) session.

5. The method of claim 1, wherein the method, prior to receiving the first source URL, further comprises:

providing, to the second device, a first request for the first source URL, wherein the first request includes the first channel identifier; and wherein the method, prior to receiving the second source URL, further comprises:

providing, to the second device, a second request for the second source URL, wherein the second request includes the second channel identifier.

6. The method of claim 5, wherein the first request and the second request include a device indicator for the first device.

7. A media client device, comprising:

one or more memories; and one or more processors, communicatively coupled to the one or more memories, configured to:

receive an electronic programming guide (EPG) including a plurality of channel identifiers for a plurality of Quadrature Amplitude Modulation (QAM) channels and a plurality of Internet Protocol (IP) channels;

receive a first tuning request including a first channel identifier, of the plurality of channel identifiers, from the EPG;

provide, to a second device, a first request for a first source Universal Resource Locator (URL), wherein the first request includes the first channel identifier;

receive, from the second device, the first source URL, wherein the first source URL includes data indicating that the first source URL corresponds to an IP channel, of the plurality of IP channels, wherein the data indicating that the first source URL corresponds to the IP channel includes a first Boolean flag having a first value;

provide, based on the data indicating that the first source URL corresponds to the IP channel, the first source URL to a third device to establish an IP communication session;

receive a second tuning request including a second channel identifier, of the plurality of channel identifiers, from the EPG;

provide, to the second device, a second request for a second source URL, wherein the second request includes the second channel identifier;

receive, from the second device, the second source URL, wherein the second source URL includes data indicating that the second source URL corresponds to a QAM channel, of the plurality of QAM channels, wherein the data indicating that the second source URL corresponds to the QAM channel includes a second Boolean flag having a second value;

provide, based on the data indicating that the second source URL corresponds to the QAM channel, the second source URL to the third device to establish a QAM communication session; and receive, from the third device, first content segments relating to the IP channel and second content segments relating to the QAM channel, wherein at least a portion of the second content segments are received concurrently with at least a portion of the first content segments.

8. The media client device of claim 7, further comprising at least one QAM tuner.

9. The media client device of claim 7, wherein the IP communication session includes a Media Source Extensions (MSE) session.

10. The media client device of claim 7, wherein the one or more processors are further configured to:

provide, based on information regarding the first content segments, a license request to a fourth device via another IP communication session; and receive, from the fourth device, a license and a key to access the first content segments.

11. The media client device of claim 10, wherein the other IP communication session includes an Encrypted Media Extensions (EME) session.

12. The media client device of claim 7, wherein the one or more processors, when providing the request for the first source URL, are configured to:

provide the request for the first source URL via middleware;

wherein the one or more processors, when receiving the first source URL, are configured to:

receive the source URL via the middleware; and wherein the one or more processors, when providing the first source URL, are configured to:

provide the source URL via a browser application.

13. The media client device of claim 12, wherein the browser application runs a Motion Picture Experts Group Dynamic Adaptive Streaming of Hypertext Transfer Protocol (MPEG-DASH) client.

14. A non-transitory computer-readable medium storing instructions, the instructions comprising:

one or more instructions that, when executed by one or more processors, cause the one or more processors to:

receive an electronic programming guide (EPG) including a plurality of channel identifiers for a plurality of channels, wherein the plurality of channels includes one or more Quadrature Amplitude Modulation (QAM) channels and one or more Internet Protocol (IP) channels;

receive a first tuning request including a first channel identifier, of the plurality of channel identifiers, from the EPG, wherein the first channel identifier is associated with an IP channel, of the one or more IP channels;
provide a request for a source Universal Resource Locator (URL),
wherein the request includes the first channel identifier;
receive the source URL,
wherein the source URL includes data indicating that the source URL corresponds to the IP channel,
wherein the data indicating that the source URL corresponds to the IP channel includes a Boolean flag having a value of two possible values;
provide, based on the data indicating that the source URL corresponds to the IP channel, the source URL via an IP communication session;
receive, via the IP communication session, first content segments relating to the IP channel;
establish a QAM communication session based on a second tuning request including a second channel identifier, of the plurality of channel identifiers, from the EPG,
wherein the second channel identifier is associated with a QAM channel, of the one or more QAM channels; and
receive, via the QAM communication session, second content segments relating to the QAM channel,
wherein at least a portion of the second content segments are received concurrently with at least a portion of the first content segments.

15. The non-transitory computer-readable medium of claim 14, wherein the IP communication session includes a Media Source Extensions (MSE) session.

16. The non-transitory computer-readable medium of claim 14, wherein the one or more instructions, when executed by the one or more processors, further cause the one or more processors to:
provide, based on information regarding the first content segments, a license request via another IP communication session; and
receive a license and a key to access the first content segments.

17. The non-transitory computer-readable medium of claim 16, wherein the other IP communication session includes an Encrypted Media Extensions (EME) session.

18. The non-transitory computer-readable medium of claim 14, wherein the one or more instructions, when executed by the one or more processors, further cause the one or more processors to:
when providing the request for the source URL, provide the request for the source URL via middleware;
when receiving the source URL, receive the source URL via the middleware; and
when providing the source URL, provide the source URL via a browser application.

19. The non-transitory computer-readable medium of claim 14, wherein the one or more instructions, that cause the one or more processors to provide the source URL, cause the one or more processors to:
provide the source URL via a browser application,
wherein the browser application runs a Motion Picture Experts Group Dynamic Adaptive Streaming of Hypertext Transfer Protocol (MPEG-DASH) client.

20. The non-transitory computer-readable medium of claim 19, wherein the MPEG-DASH client includes a dashjs player and/or a Shaka player.

* * * * *